US009866025B2

(12) United States Patent
Winter et al.

(10) Patent No.: US 9,866,025 B2
(45) Date of Patent: Jan. 9, 2018

(54) METHOD FOR THE OVERALL OPTIMIZATION OF THE OPERATION OF DISTRIBUTED STORAGE DEVICES IN AN ELECTRICAL POWER SUPPLY SYSTEM HAVING DISTRIBUTED GENERATORS AND LOADS

(75) Inventors: Martin Winter, Rosenheim (DE); Kolja Eger, Ottobrunn (DE); Roland Gersch, Munich (DE); Joerg Heuer, Oberhaching (DE)

(73) Assignee: Caterva GmbH, Pullach (DE)

( * ) Notice: Subject to any disclaimer, the term of this patent is extended or adjusted under 35 U.S.C. 154(b) by 409 days.

(21) Appl. No.: 14/416,573

(22) PCT Filed: Jul. 31, 2012

(86) PCT No.: PCT/EP2012/064926
§ 371 (c)(1),
(2), (4) Date: Jun. 2, 2015

(87) PCT Pub. No.: WO2014/019606
PCT Pub. Date: Feb. 6, 2014

(65) Prior Publication Data
US 2016/0118796 A1    Apr. 28, 2016

(51) Int. Cl.
*H02J 3/32* (2006.01)
*G06Q 10/06* (2012.01)
(Continued)

(52) U.S. Cl.
CPC .............. *H02J 3/32* (2013.01); *G05B 15/02* (2013.01); *G06Q 10/0631* (2013.01);
(Continued)

(58) Field of Classification Search
CPC ............ H02J 3/32; H02J 7/0013; G05B 15/02
(Continued)

(56) References Cited

U.S. PATENT DOCUMENTS

| 6,094,030 A | 7/2000 | Gunthorpe |
| 2002/0156537 A1 | 10/2002 | Sakakibara |

(Continued)

FOREIGN PATENT DOCUMENTS

| JP | EP 1251619 A2 * | 10/2002 | ............ H02J 7/0021 |
| WO | WO 2011070078 A2 | 6/2011 | |

*Primary Examiner* — Sean Shechtman
*Assistant Examiner* — Shon Foley
(74) *Attorney, Agent, or Firm* — Farjami & Farjami LLP

(57) ABSTRACT

The invention substantially relates to a method, wherein operational control parameters and/or control limits, which are to be conveyed using communications technology, are determined on the operator side for each of the distributed storage devices in such a way that a specific cost function is minimal for all of the distributed storage devices on the basis of locally measured variables determined at the respective storage device and transmitted to the operator and on the basis of installation-dependent control limits stored locally in each case and which are also transmitted to the operator, and wherein the operational control parameters and/or control limits, which are to be conveyed using communications technology, are transmitted from the operator side to the corresponding distributed storage devices and implemented there. Consideration of the locally limited available energy and power and the boundary conditions resulting from serving multiple applications from one storage device hereby ensures power availability and, by way of example, an optimal overall service life of all distributed storage devices.

18 Claims, 2 Drawing Sheets

Figure 1:
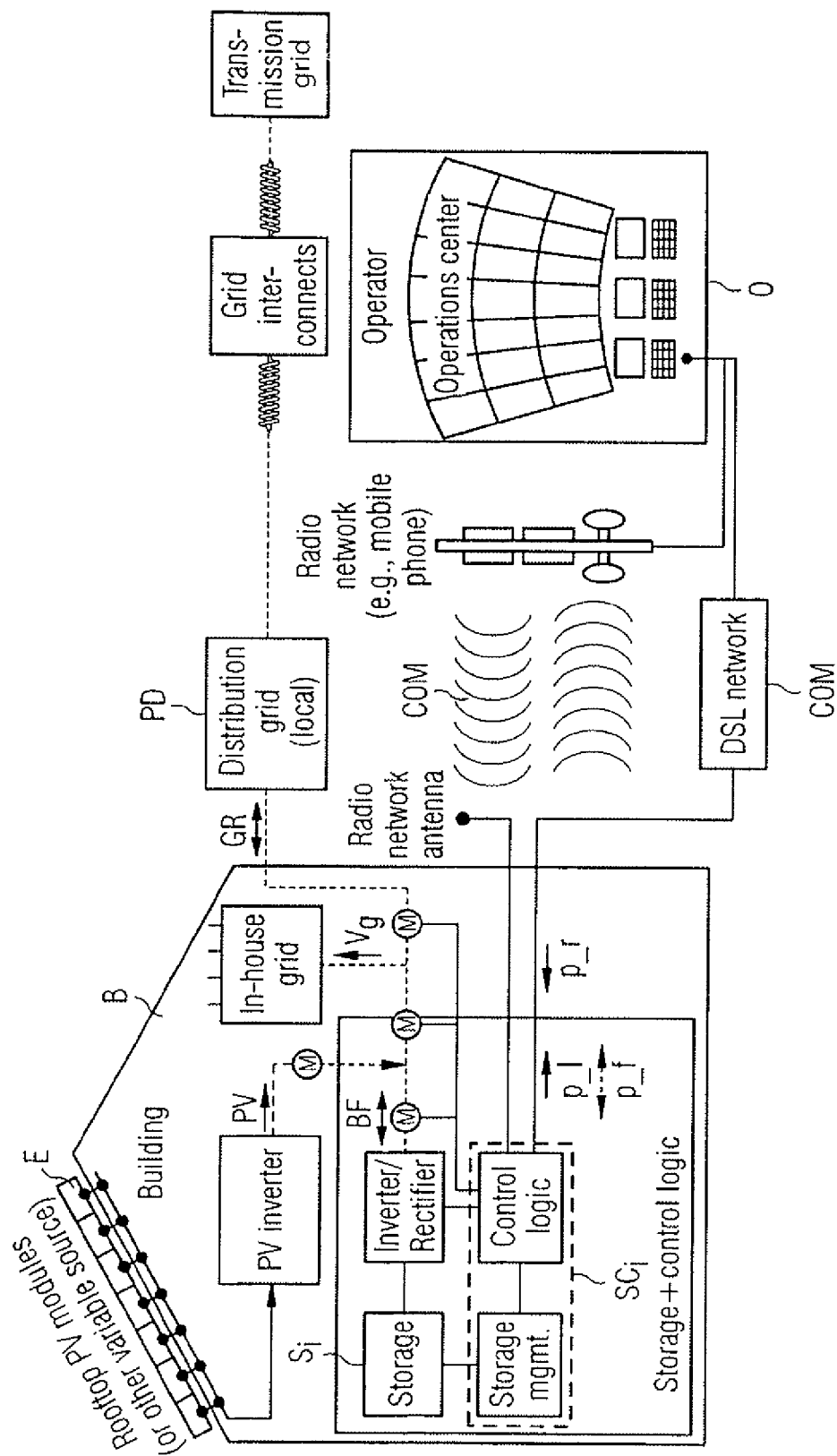

(51) Int. Cl.
*H02J 7/00* (2006.01)
*G05B 15/02* (2006.01)
*G06Q 50/06* (2012.01)

(52) U.S. Cl.
CPC ... *G06Q 10/0637* (2013.01); *G06Q 10/06375* (2013.01); *H02J 7/0013* (2013.01); *G06Q 50/06* (2013.01); *Y04S 50/12* (2013.01)

(58) Field of Classification Search
USPC .......................................................... 700/297
See application file for complete search history.

(56) References Cited

U.S. PATENT DOCUMENTS

| | | | | |
|---|---|---|---|---|
| 2012/0133337 | A1* | 5/2012 | Rombouts | H02J 3/32 320/155 |
| 2013/0229057 | A1* | 9/2013 | Taima | H02J 3/32 307/19 |

\* cited by examiner

METHOD FOR THE OVERALL OPTIMIZATION OF THE OPERATION OF DISTRIBUTED STORAGE DEVICES IN AN ELECTRICAL POWER SUPPLY SYSTEM HAVING DISTRIBUTED GENERATORS AND LOADS

This is a U.S. national phase application, which is based on, and claims priority from, PCT application Serial No. PCT/EP2012/064926, filed Jul. 31, 2012.

Method for the overall optimization of the operation of distributed storage devices in an electrical power supply system having distributed generators and loads The invention relates to a method for overall, optimization of the operation of distributed storage devices, for example charge storage devices in the form of accumulators but also thermal storage devices or gas storage devices, in an electrical power supply system having distributed generators, for example photovoltaic systems, and distributed loads.

The importance of renewable energy sources is increasing, wherein these energy sources are distributed and are difficult to predict in terms of the amount of energy they can deliver because, by way of example in photovoltaic systems, there is a dependency on the weather. This leads to stability and capacity problems in corresponding electrical power supply systems.

One solution to these problems lies in distributed energy or charge storage devices. Such storage devices are relatively expensive, however, and must be deployed effectively, for example by serving multiple: applications from one storage device.

The object underlying the invention accordingly lies in disclosing a method for overall optimization of the operation of distributed d storage devices in a power supply system in such a way that by taking into account the locally limited available energy and power and the boundary conditions resulting from serving multiple applications from one storage device, such as ensuring the power availability, a cost function for the power supply system, by way of example the total service life of all distributed storage devices in a power supply system, is optimized.

This object is achieved according to the invention by the features of claim 1. The additional claims relate to preferred embodiments of the inventive method and devices for carrying it out.

The invention substantially relates to a method, wherein operational control parameters and/or control limits, which are to be conveyed using communications technology, are determined on the operator side for each of the distributed storage devices in such a way that a specific cost function is minimal for all of the distributed storage devices on the basis of locally measured variables determined at the respective storage device and transmitted to the operator and on the basis of installation-dependent control limits stored locally in each case and which are also transmitted to the operator, and wherein the operational control parameters and/or control limits, which are to be conveyed using communications technology, are transmitted from the operator side to the corresponding distributed storage devices and implemented there. Consideration of the locally limited available energy and power and the boundary conditions resulting from serving multiple applications from one storage device hereby ensures power availability and, by way of example, an optimal overall service life of all distributed storage devices.

Figure 2:
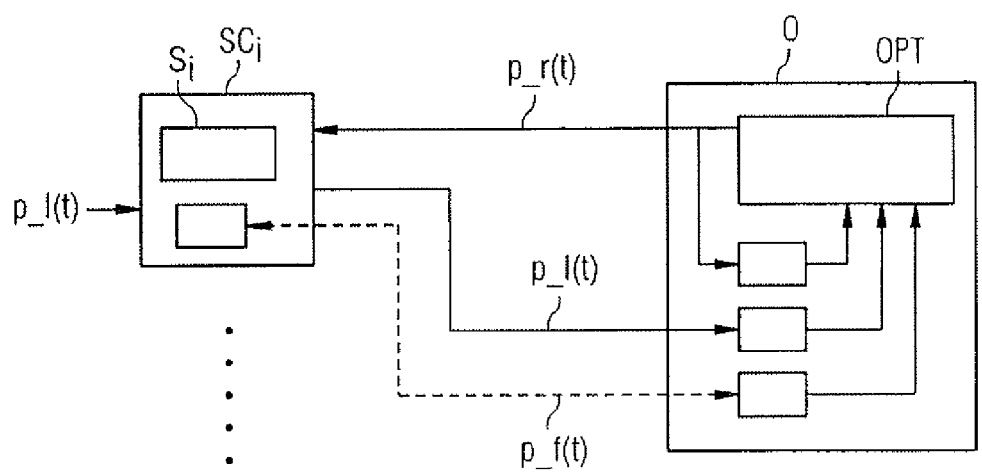

The invention will be described in more detail hereinafter with reference to exemplary embodiments illustrated in the drawings, in which:

FIG. 1 shows an overview to explain the surroundings of the device according to the invention and FIG. 2 shows a schematic diagram to explain the device according to the invention and FIG. 1 shows an overview to explain the surroundings of the device according to the invention illustrated by a building B on whose roof there is a local generator E in the form of photovoltaic cells and in which, in addition to secondary units, such as direct current/alternating current converters and measuring devices M, a storage device $S_i$, by way of example an accumulator, and a respective storage control unit $SC_i$, are located. This building B is connected for power distribution by a local distribution system PD to further power consumers, power generators and/or storage devices as well as to other levels of the power distribution/transmission grid, and for communication COM, by way of example via DSL or mobile radio, to the operator O.

FIG. 2 shows a schematic diagram to further explain the inventive method with a respective storage control unit $SC_i$ and a respective storage device $S_i$ and the operator O with an optimizations unit OPT, wherein the respective storage control unit $SC_i$ has locally measured variables p_l(t) and conveyed them to the operator and stored installation-dependent control limits p_f(t) which are conveyed to the operator and can be changed by the operator, and the operator-side optimizer OPT forms operational control parameters and/or control limits p_r(t), which are to be conveyed using communications technology, and sends them to the respective storage control unit $SC_i$ and wherein the operator O comprises storage devices for the variables p_r(t), p_l(t) and p_f(t).

On the operator side O control parameters and/or control limits p_r(t), which are to be conveyed using communications technology, are firstly determined for each of the distributed storage devices $S_i$ in such a way that a specific cost function is minimal for all of the distributed storage devices as a whole on the basis of locally measured variables p_l(t) determined at the respective storage device and transmitted to the operator and on the basis of control parameters and/or control limits p_f(t) locally stored in each case and internally transmitted to the operator. The control parameters and/or control limits p_r(t), which are to be conveyed using communications technology, are then transmitted from the operator side O to the corresponding distributed storage devices $S_i$ and implemented there, wherein this occurs either as required or at regular intervals.

A first preferred exemplary embodiment of the invention consists in that the cost function, which is to be minimized, corresponds to a service life, which is to be maximized, of all of the distributed storage devices $S_i$ as a whole and this service life is determined at least from usage histories $h_i([0,t])$ of all distributed storage devices and usage history/storage device service life models for these storage devices.

The usage histories $h_i([0,t])$ of all distributed storage devices are formed by aggregation of locally-measured variables p_l(t) transmitted to the operator and are stored and managed by the operator and typically contain at least one of the following quantities as a time series: charging/discharging currents cc([0,t]) within an operating interval, charging states soc([0,t]) within an operating interval, voltages V ([0,t]) within an operating interval, temperature values T_x([0,t]) at at least one location x within an operating interval and/or internal resistances R_i([0,t]) within an operating interval.

A remaining overall storage capacity cap_h(t) is determined by the operator O by way of example from the usage histories $h_i([0,t])$ of each storage unit and a usage history/storage capacity model, for each storage device $S_i$, wherein the service life of all of the distributed storage devices $S_i$ as a whole is attained for example if the determined remaining overall storage capacity cap_h(t) attains a specific critical overall storage capacity, by way of example 50% of the maximum possible overall storage capacity.

The usage histories $h_i([0,t])$ typically comprise accumulated previous charging profiles c(t, (soc_i, soc_f, cc)), wherein these include the number of charging/discharging procedures which the storage device $S_i$ underwent with a specific initial charging state soc_i, a specific end charging state soc_f and a specific charging current cc after a specific operating period t.

The remaining overall storage capacity cap(t) can then be formed for example in that a percentage, which is obtained by weighted integration of the accumulated previous charging profile c(t, (soc_i, soc_f, CC)) ever the range of all possible triples comprising initial, charging states, end charging states and charging/discharging currents, is subtracted from 100%, wherein the weighting function w used for weighting also depends on these triples and on the storage model. The way in which the remaining overall storage capacity is formed depends on the type of storage device used.

In the case of the first preferred exemplary embodiment of the invention, wherein the cost function, which is to be minimized, corresponds to a service life, which is to be maximized, of all of the distributed storage devices $S_i$ as a whole, an increase in the internal resistance r_h(t) is optionally also included in the service life optimization in addition to the remaining overall storage capacity cap_h(t). An increase in internal resistance r_h(t) is determined for this purpose from the respective usage histories $h_i([0,t])$ and a usage history/increase in internal resistance model for each storage device $S_i$, wherein the service life of all of the distributed storage devices $S_i$ as a whole is attained at least if all of the distributed storage devices as a whole can no longer consume and/or generate a specific critical power due to the increase in internal resistance.

At a specific time t the control parameters and/or control limits p_r(t), which are to be conveyed using communications technology, for a specific storage device $S_i$ include at least a hard limit for a maximum charging/discharging current and/or minimum and/or maximum charging states for local operation and/or a default value for a maximum charging/discharging current and/or a default value for a charging/discharging current and/or electrical power supply system service requirements, wherein the latter can include control parameters as a function of voltage, spectral components of the voltage, frequency of the fundamental component of the alternating voltage, phase of the alternating voltage and/or current and/or, in the case of a locally controlled compensation, a maximum current.

The measured variables p_l (t) locally determined at the storage device $S_i$ typically include at least one measured value, a mean value or a measured time series at least for the system voltage frequency, system voltage, spectra of the system voltage and therewith the system voltage frequency, the locally generated or consumed current, the local charging state, the local charging/discharging current, the voltage and/or the temperature at at least one location.

The locally-stored, installation-dependent, control parameters and/or control limits p_f(t) include at least a maximum charging/discharging current and/or a maximum and/or minimum charging state and can be set once by the operator and re-set if required.

The service life of all of the distributed storage devices as a whole is determined in that a list comprising the distributed storage devices is ordered according to the determined individual remaining service life of each storage device, in that the storage devices having the shortest service life in each case are successively removed from the list until the remaining capacity of all of the remarking distributed storage devices as a whole or the maximum discharging/charging current of all of the remaining distributed storage devices as a whole falls below a predefined threshold. The service life of all of the distributed storage devices as a whole then corresponds to the service life of the storage device removed last from the list.

An alternative possibility for determining the service life of all of the distributed storage devices as a whole consists in the following procedure: firstly the remaining storage capacity of each individual storage device is calculated in advance at suitable future times t_i. The storage capacity of all of the distributed storage devices as a whole is determined by adding up the remaining storage capacities of each individual storage device. The service life sought is accordingly attained after t_i and before t_(i+1) if the remaining storage capacity of all of the distributed storage devices as a whole at time t_i is greater than a given critical storage capacity and the storage capacity of all of the distributed storage devices as a whole at time t_(i+1) is smaller than the given critical storage capacity. The accuracy in determining the service life can be increased further by repeating the above-disclosed method once or several times in the interval ]t_i, t_(i+1)[.

A further alternative possibility for determining the service life of all of the distributed storage devices as a whole consists in the above procedure, only that, instead of the remaining storage capacity, the remaining maximum electrical power generation and/or consumption capability of the storage devices is considered.

The control parameters and/or control limits p_r(t), which are to be conveyed using communications technology, can optionally also be determined with the aid of a combination of a short-term consideration (t, t+Delta) and a long-term consideration (t+Delta, L), wherein the short-term consideration includes a variation in the future short-term charge status curve by taking into account boundary conditions, which are determined by prognosis on the basis of locally measured variables and additional predictions, for example for solar power, wind speed or temperature, or by using suitable functions of time, and the long-term consideration is made on the basis of statistical evaluations of earlier values for the operational control parameters and/or control limits p_r(t) and/or the locally determined measured variables (p_l(t)) and/or the locally stored internal control parameters and/or control limits p_f(t)

and/or a difference between the current variation in the short-term consideration and a typical short-term consideration.

A second preferred exemplary embodiment of the invention consists in that the cost function, which is to be minimized, corresponds to the running costs, which are to be minimized, of all of the distributed storage devices $S_i$ and these running costs are determined in that the running costs are calculated on the basis of the investment costs for the distributed storage devices, the operating costs for the distributed storage devices and the determined service life.

The investment costs for the distributed storage devices and the operating costs for the distributed storage devices are preferably linearly allocated to a remaining running time L−t, wherein L is the service life of all of the distributed storage devices $S_i$ as a whole and t is the previous running time of all of the distributed storage devices $S_i$ as a whole.

A third preferred exemplary embodiment of the invention consists in that the cost function, which is to be minimized, corresponds to a profit, which is to be maximized, in the form of a difference from incomes from all of the distributed storage devices for a remaining running time and the running costs of all of the distributed storage devices $S_i$ for a remaining service life, wherein the running costs are calculated on the basis of investment costs for the distributed storage devices, operating costs for the distributed storage devices and the determined service life.

The incomes from all of the distributed storage devices are preferably predicted in a short-term consideration, wherein constant incomes are assumed for this purpose in an associated long-term consideration, which incomes are formed for example from the averages of the previous incomes by taking account of the difference in the short-term consideration from the average.

The invention claimed is:

1. A method for overall optimization of the operation of distributed storage devices in an electrical power supply system having distributed loads, the method comprising:
   operating the distributed storage devices according to operational control parameters and/or control limits (p_r);
   wherein the operational control parameters and/or control limits (p_r), which are to be conveyed using communications technology, are determined on the operator side (O) for each of the distributed storage devices ($S_i$) in such a way that a specific cost function is minimal for all of the distributed storage devices as a whole on a basis of locally measured variables (p_l) determined at the respective storage device and transmitted to the operator,
   wherein the operational control parameters and/or control limits (p_r), which are to be conveyed using communications technology, are transmitted from the operator side (O) to the corresponding distributed storage devices ($S_i$) and implemented,
   wherein a service life of all of the distributed storage devices as a whole is determined in that:
   a list comprising the distributed storage devices is ordered according to their individual remaining service times,
   the storage devices having the shortest remaining service times in each case are successively removed from the list until the remaining capacity of all of the distributed storage devices as a whole or the maximum discharging/charging current of all of the distributed storage devices as a whole falls below a predefined threshold and
   the service life of all of the distributed storage devices as a whole corresponds to the service life of the storage device removed last from the list.

2. The method as claimed in claim 1, wherein operational control parameters and/or control limits (p_r), which are to be conveyed using communications technology, are determined on the operator side (O) for each of the distributed storage devices ($S_i$) in such a way that internal installation-dependent control limits (p_f) transmitted to the operator are taken into account for the determination of the cost function.

3. The method as claimed in claim 1, wherein the cost function, which is to be minimized, corresponds to a service life, which is to be maximized, of all of the distributed storage devices ($S_i$) as a whole and wherein the service life is determined at least from usage histories ($h_i([0,t])$) of all distributed storage devices, and usage histories and storage device service life models for these storage devices.

4. The method as claimed in claim 2, wherein the cost function, which is to be minimized, corresponds to a service life, which is to be maximized, of all of the distributed storage devices ($S_i$) as a whole and wherein the service life is determined at least from usage histories ($h_i([0,t])$) of all distributed storage devices, and usage histories and storage device service life models for these storage devices.

5. The method as claimed in claim 3, wherein the remaining overall storage capacity (cap_h(t)) is determined from the respective usage histories ($h_i([0,t])$), and a usage histories and storage capacity model for the storage devices ($S_i$) and wherein the service life of all of the distributed storage devices ($S_i$) as a whole is attained if the remaining overall storage capacity (cap_h(t)) falls below a certain critical overall storage capacity.

6. The method as claimed in claim 5, wherein the usage histories ($h_i([0,t])$) comprise accumulated previous charging profiles, wherein these include the number of charging cycles of the storage device $S_i$ that have occurred with a specific initial charging state, a specific end charging state and a specific charging current (CC) after a specific operating period (t).

7. The method as claimed in claim 6, wherein the remaining overall storage capacities (cap_i(t)) of the storage devices $S_i$ are formed in that a percentage, which is obtained by weighted integration of the accumulated previous charging profiles over the range of all possible triples comprising initial charging states, end charging states and charging/discharging currents, is subtracted from 100%, wherein the weighting function (w) also depends on these triples and on the storage model for the storage device $S_i$.

8. The method as claimed in claim 3, wherein an increase in internal resistance (r_h(t)) is determined from the respective usage histories ($h_i([0,t])$), and a usage histories and increase in internal resistance model for the respective storage devices ($S_i$) and wherein the service life of all of the distributed storage devices ($S_i$) as a whole is attained if all of the distributed storage devices as a whole can no longer consume and/or generate a specific critical electrical power due to the increase in internal resistance.

9. The method as claimed in claim 1, wherein the operational control parameters and/or control limits (p_r), which are to be conveyed using communications technology, for a respective storage device ($S_i$) include at least one of the following:
   a maximum charging/discharging current limit,
   a maximum charging/discharging current limit to be employed for local applications minimum and/or maximum charging states for local applications,
   a default value for a charging/discharging current, or
   electrical power supply system service requirements.

10. The method as claimed in claim 1, wherein the measured variables (p_l(t)) locally determined at the storage device ($S_i$) include at least one measured value or time series for at least one of the following variables: voltage frequency, voltage, spectra of the voltage and therewith the voltage frequency, locally generated current, locally consumed current, local charging state, local charging/discharging current, voltage and/or temperature.

11. The method as claimed in claim 2, wherein the internal installation-dependent control limits (p_f(t)) include at least one maximum charging/discharging current and/or maximum and/or minimum charging states.

12. The method as claimed in claim 3, wherein the service life of all of the distributed storage devices as a whole is determined in that the service life is ascertained at which the remaining capacity of all of the distributed storage devices as a whole or the maximum discharging/charging current of all of the distributed storage devices as a whole falls below a predefined threshold.

13. The method as claimed in claim 2, wherein the operational control parameters and/or control limits (p_r(t)), which are to be conveyed using communications technology, are determined with the aid of a combination of a short-term consideration and a long-term consideration, wherein the short-term consideration includes a variation in the future short-term charge status curve of each storage device $S_i$ while taking into account boundary conditions, which are determined by prognoses on the basis of locally measured variables and additional predictions or by using suitable functions of time, and the long-term consideration is made on the basis of statistical evaluations of earlier values for the operational control parameters and/or control limits (p_r(t)), which are to be conveyed, and/or the locally determined measured variables (p_l(t)) and/or the internal installation-dependent control limits (p_f(t)) and/or a difference between the current variation in the short-term consideration and a typical short-term consideration.

14. A method for overall optimization of the operation of distributed storage devices in an electrical power supply system having distributed loads, the method comprising:
    operating the distributed storage devices according to operational control parameters and/or control limits (p_r);
    wherein the operational control parameters and/or control limits (p_r), which are to be conveyed using communications technology, are determined on the operator side (O) for each of the distributed storage devices ($S_i$) in such a way that a specific cost function is minimal for all of the distributed storage devices as a whole on a basis of locally measured variables (p_l) determined at the respective storage device and transmitted to the operator,
    wherein the operational control parameters and/or control limits (p_r), which are to be conveyed using communications technology, are transmitted from the operator side (O) to the corresponding distributed storage devices ($S_i$) and implemented,
    wherein the cost function, which is to be minimized, corresponds to running costs, which are to be minimized, of all of the distributed storage devices ($S_i$) and these running costs are determined in that the running costs are calculated on the basis of investment costs for the distributed storage devices, operating costs for the distributed storage devices and a service life of all of the distributed storage devices as a whole,
    wherein the investment costs for the distributed storage devices and the operating costs for the distributed storage devices are linearly transferred to a remaining service life (L−t) of all of the distributed storage devices as a whole.

15. The method as claimed in claim 1, wherein the cost function, which is to be minimized, corresponds to a profit, which is to be maximized, in the form of a difference from incomes from all of the distributed storage devices for a remaining running time and the running costs of all of the distributed storage devices ($S_i$) for a remaining service life, wherein the running costs are calculated on the basis of investment costs for the distributed storage devices, and operating costs for the distributed storage devices.

16. The method as claimed in claim 15, wherein the incomes from all of the distributed storage devices are predicted.

17. A device for carrying out the method of claim 1, wherein there is an optimizer (OPT) on the operator side (O) in such a way that
    for each of the distributed storage devices ($S_i$) operational control parameters and/or control limits (p_r), which are to be conveyed using communications technology, can be determined on the basis of the locally measured variables (p_l) determined at the respective storage devices by minimizing a specific cost function for all of the distributed storage devices and
    the operational control parameters and/or control limits (p_r) can be transmitted from the operator side (O) to the corresponding distributed storage devices ($S_i$) and be implemented.

18. A device for carrying out the method of claim 1, wherein there is a storage control unit ($SC_i$) for a distributed storage device ($S_i$) in such a way that the locally measured variables (p_l) can be transmitted to the operator side (O) and the operational control parameters and/or control limits (p_r) can be received from the operator side (O) and can be implemented at the respective distributed storage device ($S_i$).

* * * * *